United States Patent
Zhu et al.

(10) Patent No.: US 11,552,321 B2
(45) Date of Patent: Jan. 10, 2023

(54) ANODE RECIRCULATION SYSTEM WITH EJECTOR FOR SOLID OXIDE FUEL CELL

(71) Applicant: Tsinghua University, Beijing (CN)

(72) Inventors: Yinhai Zhu, Beijing (CN); Peixue Jiang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/564,111

(22) Filed: Dec. 28, 2021

(65) Prior Publication Data

US 2022/0223893 A1 Jul. 14, 2022

(30) Foreign Application Priority Data

Jan. 8, 2021 (CN) .......................... 202110021480.X

(51) Int. Cl.
| | |
|---|---|
| *H01M 8/1233* | (2016.01) |
| *H01M 8/0276* | (2016.01) |
| *H01M 8/0444* | (2016.01) |
| *H01M 8/04701* | (2016.01) |
| *H01M 4/86* | (2006.01) |
| *H01M 8/12* | (2016.01) |

(52) U.S. Cl.
CPC ....... *H01M 8/1233* (2013.01); *H01M 8/0276* (2013.01); *H01M 8/04447* (2013.01); *H01M 8/04738* (2013.01); *H01M 2004/8684* (2013.01); *H01M 2008/1293* (2013.01)

(58) Field of Classification Search
CPC ............. H01M 8/1233; H01M 8/0276; H01M 8/04447; H01M 8/04738; H01M 2004/8684; H01M 2008/1293
See application file for complete search history.

(56) References Cited

FOREIGN PATENT DOCUMENTS

AT 524334 * 5/2022

OTHER PUBLICATIONS

English translation of Schmidt et al, AT524334 obtained Nov. 4, 2022 from Google Patents (Year: 2020).*

* cited by examiner

*Primary Examiner* — Sarah A. Slifka
(74) *Attorney, Agent, or Firm* — Patterson + Sheridan, LLP

(57) ABSTRACT

The present disclosure relates to the technical field of fuel cells, in particular to an anode recirculation system with an ejector for a solid oxide fuel cell. The heat exchanger is adopted in the anode recirculation system for the solid oxide fuel cell, the temperature of the fuel gas can be increased through heat exchange between the fuel gas as the primary flow medium and the cell exhaust as the secondary flow medium. The fuel at room temperature stored in the fuel tank is used as the cooling medium of the valve core needle to cool the valve core needle, so that it is ensured that a temperature of the stepping motor does not exceed a failure temperature.

1 Claim, 2 Drawing Sheets

ANODE RECIRCULATION SYSTEM WITH EJECTOR FOR SOLID OXIDE FUEL CELL

CROSS-REFERENCE TO RELATED APPLICATIONS

This patent application claims the benefit and priority of Chinese Patent Application No. 202110021480.X filed on Jan. 8, 2021, the disclosure of which is incorporated by reference herein in its entirety as part of the present application.

TECHNICAL FIELD

The present disclosure relates to the technical field of fuel cells, in particular to an anode recirculation system with an ejector for a solid oxide fuel cell.

BACKGROUND ART

A solid oxide fuel cell (hereinafter referred to as SOFC) is a high-temperature fuel cell. The exhaust temperature of the fuel cell is up to more than 600° C. There is a large amount of potentially available heat energy in the fuel cell exhaust. Furthermore, oxygen ions of the fuel cell pass through the electrolyte layer and synthesize water with hydrogen ions at the anode, therefore, the anode exhaust is rich in water vapor. In the SOFC system, providing an anode recirculation system can make full use of heat and water vapor in the exhaust. As the ejector has no moving parts and it is simple to maintain, the ejector is often used to accomplish recirculation, pressurization and mixing process of the gas in the anode recirculation system of the SOFC.

An ejector is a key part for the anode recirculation system. In general, the entrainment ratio is a main index to evaluate the performance of the ejector. The entrainment ratio (ω) is a ratio of a mass flow rate of the secondary flow medium to a mass flow rate of the primary flow medium. The calculation equation is as follows:

$$\omega = \frac{m_S}{m_P}$$

Where $m_S$ and $m_P$ are mass flow rates of the secondary flow medium and the primary flow medium respectively, which are related to temperatures and pressures of the secondary flow medium and the primary flow medium.

According to published research results, increasing the temperature of the primary flow medium can effectively increase the entrainment ratio. However, simply increasing the temperature of the primary flow medium will cause the fact that the adjustable ejector cannot work normally. This is because the adjustable ejector adjusts the flow rate by driving the valve core needle to move through the stepping motor. Due to internal insulation performance required by the stepping motor, the motor temperature needs to be controlled at a certain temperature (about 130° C.). If the high-temperature primary flow medium flows directly through the valve core needle, the temperature of the valve core needle will be too high, thereby resulting in damage to the motor.

SUMMARY

An object of the present disclosure is to provide an anode recirculation system with an ejector for a solid oxide fuel cell, which increases a temperature of a primary flow medium through heat exchange between the primary flow medium and the secondary flow medium, so as to improve performance of the anode recirculation system for the solid oxide fuel cell.

An anode recirculation system with an ejector for a solid oxide fuel cell provided by the present disclosure, includes a fuel storage tank, a stepping motor, a cooling section, a valve core needle, a nozzle, a secondary flow suction chamber, a mixing chamber, a diffuser, a solid oxide fuel cell, an air source and a heat exchanger. The stepping motor, the cooling section, the nozzle and the secondary flow suction chamber are installed coaxially. A fuel gas inlet and a fuel gas outlet are provided on the cooling section; the fuel storage tank is connected with the fuel gas inlet through a pipe provided with a regulating valve. A connection sealing element is arranged between the cooling section and the nozzle, the valve core needle is located centrally within the cooling section and the nozzle. The valve core needle passes through a circular hole provided with a sealing ring, at a center of the connection sealing element. The nozzle is inserted into the secondary flow suction chamber. A primary flow fuel gas inlet is provided at an end of the nozzle close to the connection sealing element; a secondary flow exhaust inlet is provided at a front portion of the secondary flow suction chamber. An ejector outlet at an end of the diffuser is connected with a fuel gas inlet of the solid oxide fuel cell. Two inlets of the heat exchanger are connected with the fuel gas outlet of the cooling section and an exhaust outlet of the solid oxide fuel cell respectively, and two outlets of the heat exchanger are connected with the primary flow fuel gas inlet at a front end of the nozzle and the secondary flow exhaust inlet respectively; the air source is connected with the solid oxide fuel cell.

The anode recirculation system with the ejector for the solid oxide fuel cell, provided by the present disclosure, has the following advantages.

In the anode recirculation system with the ejector for the solid oxide fuel cell provided by the present disclosure, a heat exchanger is adopted in the anode recirculation system for the solid oxide fuel cell, the temperature of the fuel gas can be increased through heat exchange between the primary flow medium i.e., the fuel gas, and the secondary flow medium i.e., the cell exhaust. The fuel at room temperature stored in the fuel tank is used as the cooling medium of the valve core needle to cool the valve core needle, so that it is ensured that a temperature of the stepping motor does not exceed a failure temperature. After cooling of the valve core needle, it can be ensured that the adjustable ejector is effectively used in the anode recirculation system for the solid oxide fuel cell. Because the temperature of the primary flow medium of the ejector is increased, the entrainment ratio of the ejector can be significantly increased and the performance of the anode recirculation system can be improved. Furthermore, the present disclosure ensures safe operation of the adjustable ejector at the same time of improving the performance of the ejector through increasing the temperature of the primary flow medium.

BRIEFT DESCRIPTION OF THE DRAWINGS

List of reference numbers: 1 fuel storage tank, 2 regulating valve, 3 stepping motor, 4 valve core needle, 5 connection sealing element, 6 nozzle, 7 secondary flow suction chamber, 8 mixing chamber, 9 diffuser, 10 ejector outlet, 11 fuel gas outlet, 12 air source, 13 heat exchanger, 14 fuel gas inlet, 15 solid oxide fuel cell, 16 galvanic pile exhaust, 17 regulating valve, 18 secondary flow exhaust inlet, 19 primary flow fuel gas inlet, 20 cooling section, 21 sealing ring.

DETAILED DESCRIPTION OF THE EMBODIMENTS

Figure 1:
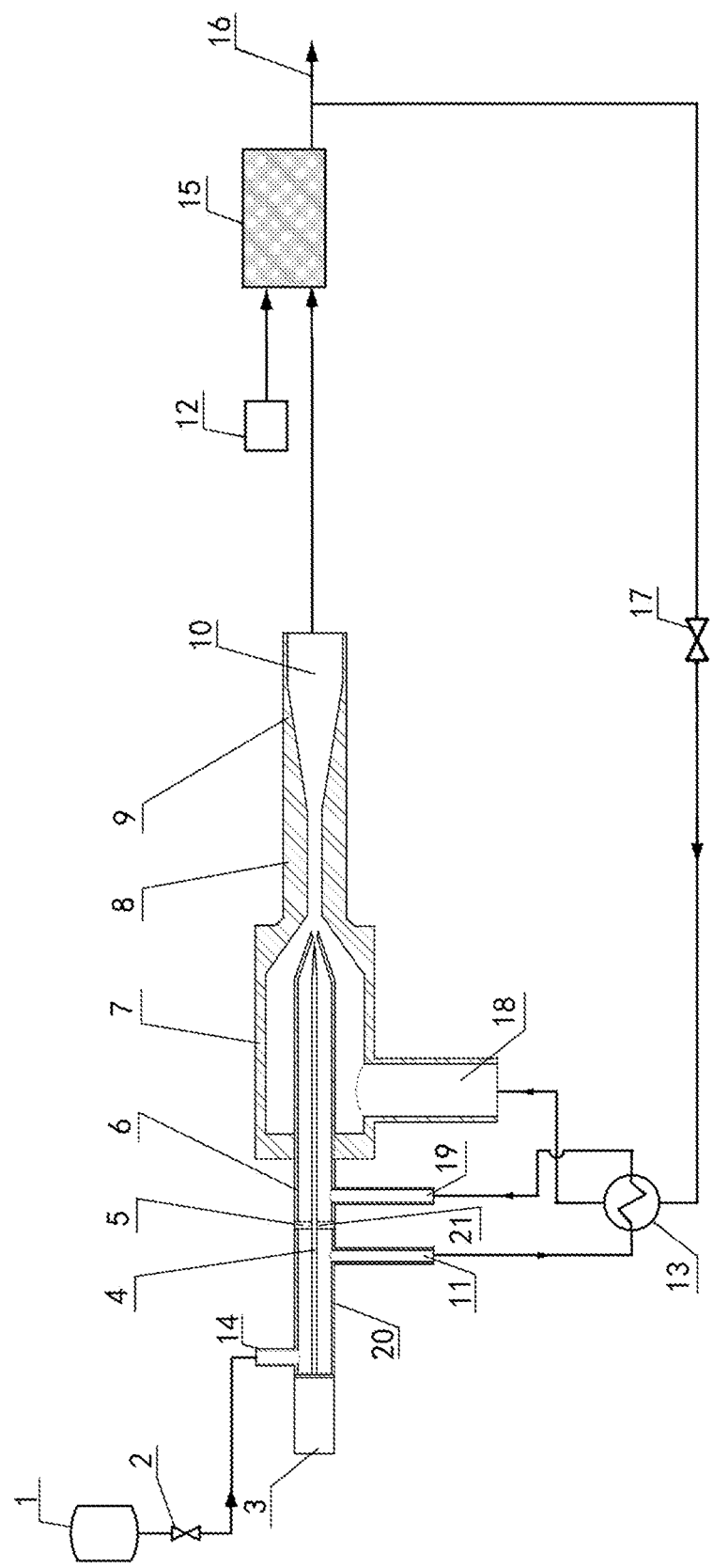
FIG. 1 is a schematic structural diagram of an anode recirculation system with an ejector for a solid oxide fuel cell according to the present disclosure.
Figure 2:
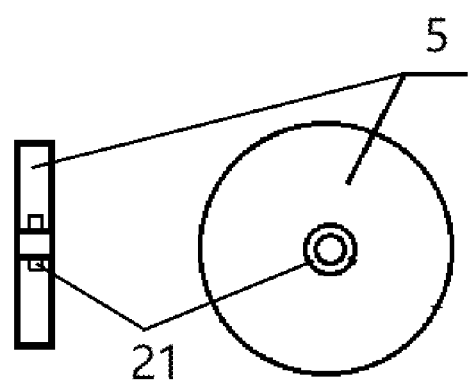
FIG. 2 is a schematic structural diagram of another ejector with the core needle cooled by cooling medium according to the present disclosure.

A structure of an anode recirculation system with an ejector for solid oxide fuel cells, provided by the present disclosure, is shown in FIG. 1. The anode recirculation system includes a fuel storage tank 1, a stepping motor 3, a cooling section 20, a valve core needle 4, a nozzle 6, a secondary flow suction chamber 7, a mixing chamber 8, a diffuser 9, a solid oxide fuel cell 15, an air source 12 and a heat exchanger 13. The stepping motor 3, the cooling section 20, the nozzle 6 and the secondary flow suction chamber 7 are installed coaxially. A fuel gas inlet 14 and a fuel gas outlet 11 are provided on the cooling section 20. The fuel storage tank 1 is connected with the fuel gas inlet 14 through a pipe provided with a regulating valve 17. A connection sealing element 5 is arranged between the cooling section 20 and the nozzle 6. The valve core needle 4 is located centrally within the cooling section 20 and the nozzle 6. The valve core needle 4 passes through a circular hole provided with a sealing ring 21, at the center of the connection sealing element 5. The structure of the connection sealing element 5 is shown in FIG. 2. The nozzle 6 is inserted into the secondary flow suction chamber 7, and a primary flow fuel gas inlet 19 is provided at an end of the nozzle 6 close to the connection sealing element 5. A secondary flow exhaust inlet 18 is provided at a front portion of the secondary flow suction chamber 7, and the ejector outlet 10 at the end of the diffuser 9 is connected with the fuel gas inlet of the solid oxide fuel cell 15. Two inlets of the heat exchanger 13 are connected with the fuel gas outlet 11 of the cooling section 20 and the exhaust outlet 16 of the solid oxide fuel cell 15 respectively. Two outlets of the heat exchanger 13 are connected with the primary flow fuel gas inlet 19 of the nozzle 6 and the secondary flow exhaust inlet 18 respectively. The air source 12 is connected to the solid oxide fuel cell 15.

The working principle and working process of the present disclosure are described in detail below in combination with the accompanying drawings:

The working principle of the anode recirculation system with the ejector for the solid oxide fuel cell is provided as follows. The temperature of the fuel gas is increased by heat exchange between cold fluid and hot fluid in the heat exchanger 13. The cold fluid and the hot fluid are cooling gas fuel from the fuel tank through the cooling section and high-temperature exhaust discharged from the solid oxide fuel cell 15 respectively, and the temperature of the fuel is increased by the high-temperature exhaust. After being heated by the heat exchanger 13, the fuel gas enters the primary fuel gas inlet 19 of the nozzle 6. After being cooled by the heat exchanger 13, the fuel cell exhaust enters the secondary flow exhaust inlet 18 of the secondary flow suction chamber 7. Fuel at room temperature from the fuel storage tank 1 is used as cooling medium to cool the valve core needle 4.

The working process of the anode recirculation system with the ejector for the solid oxide fuel cell of the present disclosure is provided as follows. The fuel in the fuel storage tank 1 passes through the fuel gas inlet 14 via the regulating valve 2, and then enters the cooling section 20 to cool the valve core needle 4. A circular hole is formed at the center of the connection sealing element 5. A sealing ring 21 is arranged around the circular hole, and the valve core needle 4 passes through the circular hole. The sealing ring 21 plays a sealing role to prevent leakage between the fuel gas in the cooling section and the fuel gas in the nozzle. The cooling section and the nozzle are connected and fixed with each other by the connection sealing element. During operation of the ejector, the connection sealing element is stationary, the valve core needle 4 moves left and right, and the sealing ring 21 plays a sealing role when the valve core needle 4 is moving. The cooling fuel gas flows out from the fuel gas outlet 11 and enters into the heat exchanger 13. In the heat exchanger 13, the fuel gas is heated, and then enters the primary flow fuel gas inlet 19 of the nozzle 6, forming a supersonic flow at the outlet of the nozzle 6, thereby sucking the secondary flow exhaust from the secondary flow exhaust inlet 18 into the secondary flow suction chamber 7. The primary flow fuel gas and the secondary flow exhaust are mixed in the mixing chamber 8. The mixed fuel gas flows out of the ejector outlet 10 from the diffuser 9, and the fuel fluid from the ejector outlet 10 enters the solid oxide fuel cell 15. At the same time, air flows into the solid oxide fuel cell 15 from the air source 12. The fuel and the oxygen in the air react chemically with each other, and then are discharged from the solid oxide fuel cell. One end of the galvanic pile exhaust 16 is discharged into the surrounding environment. The other end of the galvanic pile exhaust 16 is connected with a valve 17, entering the secondary flow exhaust inlet 18 of the secondary flow suction chamber 7 after being cooled by the heat exchanger 13.

The stepping motor 3 controls the valve core needle 4 to move the valve core needle 4 left and right in a translation mode. The flow area of the primary flow medium in the nozzle throat is adjusted by a depth of the valve core needle 4 inserted into the nozzle throat, so as to adjust the flow rate of the primary flow medium.

What is claimed is:

1. An anode recirculation system with an ejector for a solid oxide fuel cell, comprising a fuel storage tank, a stepping motor, a cooling section, a valve core needle, a nozzle, a secondary flow suction chamber, a mixing chamber, a diffuser, a solid oxide fuel cell, an air source and a heat exchanger; the stepping motor, the cooling section, the nozzle and the secondary flow suction chamber are installed coaxially, a fuel gas inlet and a fuel gas outlet are provided on the cooling section, the fuel storage tank is connected with the fuel gas inlet through a pipe; a connection sealing element is arranged between the cooling section and the nozzle, the valve core needle is located centrally within the cooling section and the nozzle, the valve core needle passes through a circular hole provided with a sealing ring, at a center of the connection sealing element, the nozzle is inserted into the secondary flow suction chamber, a primary flow fuel gas inlet is provided at an end of the nozzle close to the connection sealing element; a secondary flow exhaust inlet is provided at a front portion of the secondary flow suction chamber, an ejector outlet is connected with a fuel gas inlet of the solid oxide fuel cell; two inlets of the heat exchanger are connected with the fuel gas outlet of the cooling section and an exhaust outlet of the solid oxide fuel cell respectively, and two outlets of the heat exchanger are connected with the primary flow fuel gas inlet at a front end of the nozzle and the secondary flow exhaust inlet respectively; the air source is connected with the solid oxide fuel cell.

* * * * *